(12) United States Patent
Nishimura et al.

(10) Patent No.: US 7,672,078 B2
(45) Date of Patent: Mar. 2, 2010

(54) MAGNETIC RECORDING/REPRODUCING APPARATUS

(75) Inventors: Takumi Nishimura, Ehime (JP); Takashi Kimura, Ehime (JP)

(73) Assignee: Matsushita Electric Industrial Co., Ltd., Kadoma-shi (JP)

( * ) Notice: Subject to any disclaimer, the term of this patent is extended or adjusted under 35 U.S.C. 154(b) by 400 days.

(21) Appl. No.: 11/662,779

(22) PCT Filed: Sep. 8, 2005

(86) PCT No.: PCT/JP2005/016518

§ 371 (c)(1),
(2), (4) Date: Mar. 14, 2007

(87) PCT Pub. No.: WO2006/030689

PCT Pub. Date: Mar. 23, 2006

(65) Prior Publication Data

US 2007/0263318 A1   Nov. 15, 2007

(30) Foreign Application Priority Data

Sep. 14, 2004   (JP)   ............................. 2004-266263

(51) Int. Cl.
*G11B 5/008*   (2006.01)
(52) U.S. Cl. ...................................... 360/95
(58) Field of Classification Search ................ 360/95
See application file for complete search history.

(56) References Cited

U.S. PATENT DOCUMENTS

| | | | | |
|---|---|---|---|---|
| 5,155,639 A | * | 10/1992 | Platter et al. | 360/95 |
| 5,754,361 A | * | 5/1998 | Sakai et al. | 360/95 |
| 5,930,089 A | * | 7/1999 | Anderson | 360/128 |
| 6,215,618 B1 | * | 4/2001 | Anderson et al. | 360/128 |
| 6,678,118 B2 | * | 1/2004 | Tanaka et al. | 360/128 |
| 6,867,947 B2 | * | 3/2005 | Davis | 360/128 |

FOREIGN PATENT DOCUMENTS

| | | |
|---|---|---|
| JP | 2002-133618 | 5/2002 |
| JP | 2002-157715 | 5/2002 |

* cited by examiner

*Primary Examiner*—Mark Blouin
(74) *Attorney, Agent, or Firm*—Kratz, Quintos & Hanson, LLC

(57) ABSTRACT

It is an object of the invention to provide a magnetic recording/reproducing apparatus in which a special motor for driving the head cleaning mechanism is eliminated, and space can be saved with low cost. An end of a tape accommodated in a tape cassette 2 has a coupling element 8, the coupling element 8 is pulled out by a tape-pulling-out element 40 and taken up around a drive reel 20, the magnetic recording/reproducing apparatus comprises a head cleaning mechanism 90 for cleaning a magnetic head 7, the head cleaning mechanism 90 includes a head brush portion for holding a brush portion, and a cam mechanism for changing a position of the head brush portion, the cam mechanism is operated by a tape-pulling-out element moving member 50 and a loading lever 30.

7 Claims, 14 Drawing Sheets

MAGNETIC RECORDING/REPRODUCING APPARATUS

TECHNICAL FIELD

The present invention relates to a magnetic recording/reproducing apparatus which pulls out an end of a tape from a tape cassette of a single hub having one reel around which a tape is wound, and which winds the tape around a drive reel, and which carries out recording and replaying operations.

BACKGROUND TECHNIQUE

A head cleaning mechanism in a conventional magnetic recording/reproducing apparatus of this kind uses a special drive motor frequently, and a system in which the head cleaning mechanism turns and moves through an L-shaped angle is suggested (e.g., patent document 1).

[Patent Document 1]
Japanese Patent Application Laid-open No. H11-296827 (paragraph Nos. (0022), (0023), (0024), FIGS. 2 and 3)

DISCLOSURE OF THE INVENTION

Problem to be Solved by the Invention

The conventional apparatus has a problem that since the special motor is required for driving the head cleaning mechanism, and a space for turning and moving the head cleaning mechanism through the L-shaped angle, and the apparatus can not be reduced in size.

Hence, it is an object of the invention to provide a magnetic recording/reproducing apparatus in which the special motor for driving the head cleaning mechanism is eliminated, and space can be saved with low cost.

Means for Solving the Problem

A first aspect of the present invention provides a magnetic recording/reproducing apparatus comprising a leader tape having one end connected to a drive reel, a tape-pulling-out element connected to the other end of the leader tape, a tape-pulling-out element moving member for moving the tape-pulling-out element into a tape cassette, a pulling-out element moving motor for operating the tape-pulling-out element moving member, a cassette holder for moving the tape cassette to a cartridge reel, a loading lever connected to the cassette holder, a loading motor for operating the loading lever, and a magnetic head for recording and reproducing into and from a tape, in which an end of the tape accommodated in the tape cassette has a coupling element, the coupling element is pulled out by the tape-pulling-out element and taken up around the drive reel, the magnetic recording/reproducing apparatus comprising a head cleaning mechanism for cleaning the magnetic head, wherein the head cleaning mechanism includes a head brush portion for holding a brush portion, and a cam mechanism for changing a position of the head brush portion, the cam mechanism is operated by the tape-pulling-out element moving member and the loading lever.

According to a second aspect, in the first aspect, the tape-pulling-out element moving member brings the cam mechanism into its operable state, and the loading lever changes the position of the head brush portion.

According to a third aspect, in the second aspect, the cam mechanism includes a first cam mechanism which abuts against the tape-pulling-out element moving member and the loading lever, and a second cam mechanism for holding the head brush portion, the first cam mechanism is formed with a first cam groove, the tape-pulling-out element moving member displaces the first cam groove in an operation direction of the loading lever, and the loading lever moves the second cam mechanism together with the first cam mechanism.

According to a fourth aspect, in the first aspect, the tape-pulling-out element moving member is disposed on the side of the cassette holder, the loading lever is disposed on the side of the cassette holder on the same side as the tape-pulling-out element moving member, the head cleaning mechanism is disposed between the magnetic head and the loading lever.

According to a fifth aspect, in the fourth aspect, a pair of track grooves for guiding the tape-pulling-out element is formed between a portion of the apparatus in the vicinity of the tape-pulling-out element moving member and the drive reel, the magnetic head is disposed between the pair of track grooves, and a member forming one of the track grooves is provided with the head cleaning mechanism.

According to a sixth aspect, in the first aspect, the head brush portion includes a plurality of brush portions, and at least one of the brush portions has a brush direction different from those of other brush portions.

According to a seventh aspect, in the sixth aspect, a brush tip of the one brush portion and brush tips of other brush portions are inclined in mutually separating directions.

Effect of the Invention

According to the present invention, the tape-pulling-out element moving motor and the loading motor can be used as the drive source of the head cleaning mechanism, the special drive source for operating the head cleaning mechanism can be eliminated, and a space can be saved with low cost.

Figure 1:
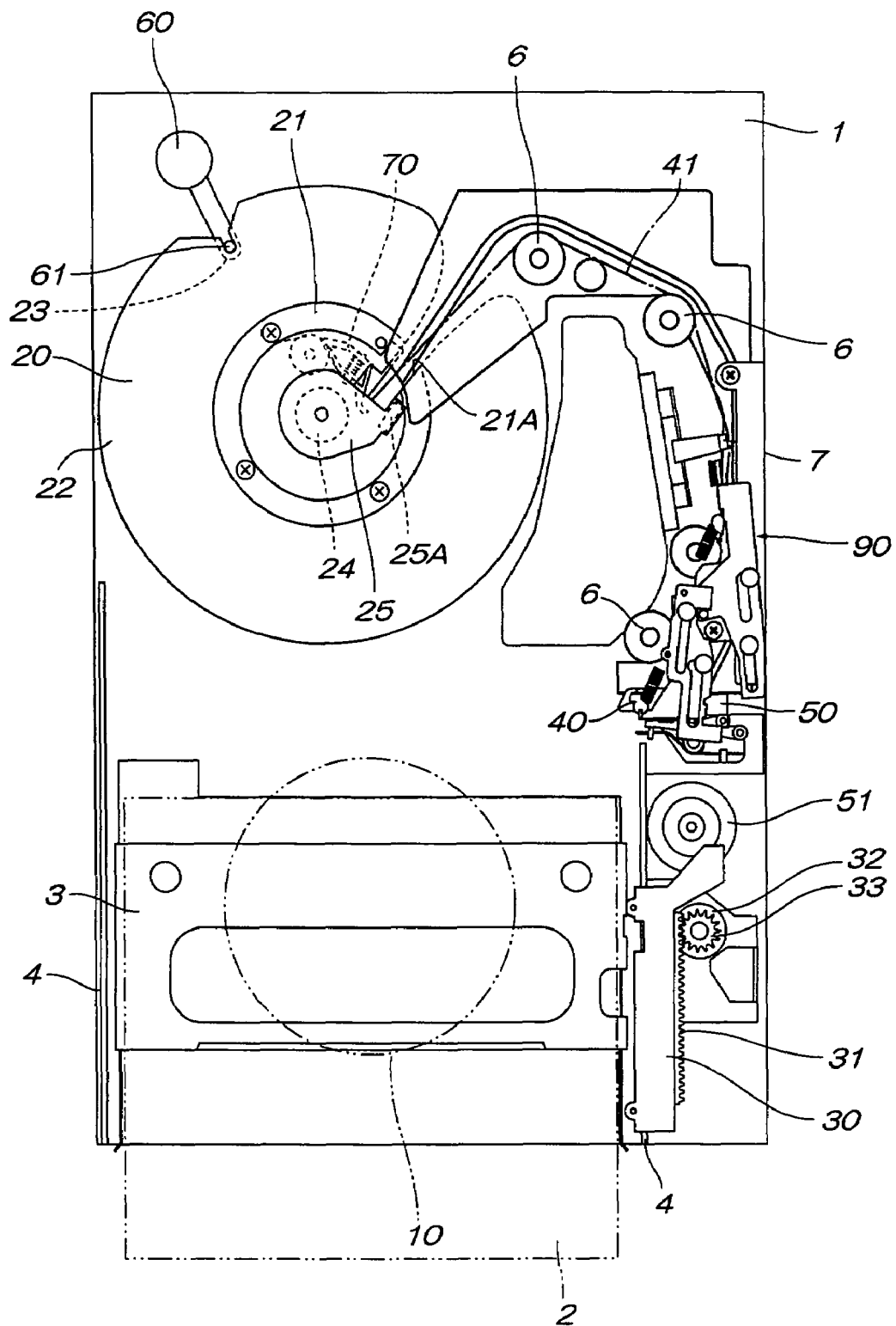
FIG. 1 is a plan view of an essential portion of a magnetic recording/reproducing apparatus according to an embodiment of the present invention.

EXPLANATION OF SYMBOLS 2 tape cassette
5 track groove
20 drive reel
30 loading lever
32 loading motor
40 tape-pulling-out element
41 reader tape
50 tape-pulling-out element moving member
51 tape-pulling-out element moving motor
90 head cleaning mechanism
91 first cam member
91A first cam groove
92 second cam member
92A second cam groove
97 head brush portion
97A brush portion
97B brush portion

BEST MODE FOR CARRYING OUT THE INVENTION

According to the magnetic recording/reproducing apparatus of the first aspect of the invention, the head cleaning mechanism includes a head brush portion for holding a brush portion, and a cam mechanism for changing a position of the head brush portion, the cam mechanism is operated by the tape-pulling-out element moving member and the loading lever. With this aspect, the head cleaning mechanism is operated utilizing the tape-pulling-out element moving member which moves the tape-pulling-out element into the cassette and the loading lever which moves the tape cassette to the cartridge reel. Therefore, it is possible to use the tape-pulling-out element moving motor and the loading motor as the drive source of the head cleaning mechanism, the special drive source for driving the head cleaning mechanism can be eliminated, and the space can be saved with low cost.

According to the second aspect of the invention, in the magnetic recording/reproducing apparatus of the first aspect, the tape-pulling-out element moving member moves the cam mechanism to bring the cam mechanism into its operable state, and the loading lever changes the position of the head brush portion. With this aspect, the operation of the head cleaning mechanism is divided into two stages, i.e., the moving operation for moving the cam mechanism into the movable state and the operation for changing the position of the head brush portion, and in each of the operations, the functions of the member and motor to be operated are divided, and stable operation having little malfunction can be realized.

According to the third aspect of the invention, in the magnetic recording/reproducing apparatus of the second aspect, the cam mechanism includes a first cam mechanism which abuts against the tape-pulling-out element moving member and the loading lever, and a second cam mechanism for holding the head brush portion, the first cam mechanism is formed with a first cam groove, the tape-pulling-out element moving member displaces the first cam groove in an operation direction of the loading lever, and the loading lever moves the second cam mechanism together with the first cam mechanism. With this aspect, the cam mechanism also comprises two members, the functions of the operations of two stages are also divided on the side of the cam mechanism, and stable operation having little malfunction can be realized.

According to the fourth aspect of the invention, in the magnetic recording/reproducing apparatus of the first aspect, the tape-pulling-out element moving member is disposed on the side of the cassette holder, the loading lever is disposed on the side of the cassette holder on the same side as the tape-pulling-out element moving member, and the head cleaning mechanism is disposed between the magnetic head and the loading lever. With this aspect, the loading lever and the tape-pulling-out element moving member are disposed on the one side of the head cleaning mechanism, and the magnetic head is disposed on the other side. Therefore, the head cleaning mechanism can be moved from the one side. Thus, it is easy to transmit the operations of the loading lever and the tape-pulling-out element moving member to the head cleaning mechanism.

According to the fifth aspect of the invention, in the magnetic recording/reproducing apparatus of the fourth aspect, a pair of track grooves for guiding the tape-pulling-out element is formed between a portion of the apparatus in the vicinity of the tape-pulling-out element moving member and the drive reel, and the magnetic head is disposed between the pair of track grooves, a member forming one of the track grooves is provided with the head cleaning mechanism. With this aspect, a member formed with the track groove that must be provided in the vicinity of the magnetic head is provided with the head cleaning mechanism. Therefore, the special member for providing the head cleaning mechanism can be omitted, and the space can be saved with low cost.

According to the sixth aspect of the invention, in the magnetic recording/reproducing apparatus of the first aspect, the head brush portion includes a plurality of brush portions, and at least one of the brush portions has a brush direction different from those of other brush portions. With this aspect, the application direction of force from the brush portion with respect to the magnetic head can be different and thus, the cleaning ability can be enhanced.

According to the seventh aspect of the invention, in the magnetic recording/reproducing apparatus of the sixth aspect, a brush tip of the one brush portion and brush tips of other brush portions are inclined in mutually separating directions. With this aspect, it is possible to apply the brush tip of the one brush portion in the moving direction and to apply the brush tip of the other brush portion in the opposite direction, and it is possible to carry out these applications alternately. Therefore, it is possible to effectively clean different kinds of contamination and accretion.

Preferred Embodiment

A magnetic recording/reproducing apparatus of an embodiment of the present invention will be explained below.

FIG. 1 is a plan view of an essential portion of the magnetic recording/reproducing apparatus of the embodiment.

A base 1 of an apparatus main body includes a cartridge reel 10 having rotating means such as a motor, and a drive reel 20 having another rotating means. A cassette holder 3 which holds the tape cassette 2 and which moves the tape cassette 2 is provided on the side of the cartridge reel 10 of the base 1. A pair of rails 4 is disposed on the side of the cartridge reel 10 of the base 1, and the cassette holder 3 is provided such that the cassette holder 3 can slide along the pair of rails 4.

A loading lever 30 is slidably provided on one of the rails 4. The loading lever 30 is connected to the cassette holder 3, and the cassette holder 3 is operated by movement of the loading lever 30.

A rack 31 is connected to a surface of the loading lever 30 on the side of the base 1. A loading motor 32 and a gear 33 connected to the loading motor 32 are disposed on the side of the loading lever 30. The rack 31 and the gear 33 mesh with each other, and the loading lever 30 slides along the rails 4 by rotation of the loading motor 32.

A tape-pulling-out element 40 is disposed on the side of the tape cassette 2, that is, disposed in the vicinity of a door (not shown) of the tape cassette 2, when the loading operation is completed. The tape-pulling-out element 40 is held by a tape-pulling-out element moving member 50. The tape-pulling-out element moving member 50 is engaged with a groove (not shown) provided in a direction moving toward and away from a door of the tape cassette 2. A tape-pulling-out element moving motor 51 is disposed in a space between the loading motor 32 and the tape-pulling-out element 40 on the side of the loading lever 30. The tape-pulling-out element moving member 50 is connected to the tape-pulling-out element moving motor 51 through a gear mechanism (not shown).

Track grooves 5 are formed between positions in the vicinity of the tape-pulling-out element 40 and a reel hub 21 of a drive reel 20. Although only the track groove 5 on the side of the base 1 is shown in FIG. 1, another track groove having the same shape is also formed in a member (not shown) disposed at a predetermined distance from the former track groove 5, and the tape-pulling-out element 40 is guided by the pair of track grooves 5. A plurality of rollers 6 and a magnetic head 7 are disposed on the side of the track groove 5. In a state shown in the drawing, a reader tape 41 is disposed along the track groove 5. One end of the reader tape 41 is connected to the Drive reel 20, and the other end of the reader tape 41 is connected to the tape-pulling-out element 40.

The drive reel 20 includes a reel flange 22. The reel flange 22 is formed at its outer peripheral end with a flange groove 23. Although only the reel flange 22 on the side of the base 1 is shown in the drawing, a pair of reel flanges 22 is connected to both end surfaces of the reel hub 21. A hub opening 21A is formed in a portion of an outer periphery of the reel hub 21, and the reader tape 41 passes through the hub opening 21A. The tape-pulling-out element 40 is fitted into the hub opening 21A. The drive reel 20 is provided at its center with a drive shaft 24 which transmits rotation of the rotating means such as the motor. The connection of the drive shaft 24 with respect to the reel hub 21 and the reel flange 22 is released by the lock member 70 at the time of tape threading motion, and drive shaft 24 is connected to the reel hub 21 and the reel flange 22 at the time of recording and replaying operations. The reel hub 21 is provided at its end surface with a magnet holding member 25. A magnet 25A is disposed in the vicinity of the hub opening 21A in the reel hub 21 by this magnet holding member 25.

A lock motor 60 and a pin 61 which moves into the flange groove 23 by the rotation of the lock motor 60 are disposed on the side of the outer periphery of the reel flange 22 on the side of the base 1.

A head cleaning mechanism 90 is disposed between the magnetic head 7 and the loading lever 30. Therefore, the loading lever 30 and the tape-pulling-out element moving member 50 are disposed on one side of the head cleaning mechanism 90, and the head cleaning mechanism 90 can be moved from one side. The head cleaning mechanism 90 is provided with a member (not shown) which forms the track groove 5 located not only the side of the base 1. The head cleaning mechanism 90 is operated utilizing the tape-pulling-out element moving member 50 which moves the tape-pulling-out element 40 into the tape cassette 2, and the loading lever 30 which moves the tape cassette 2 toward the cartridge reel 10.

Next, a structure around the tape-pulling-out element moving member 50 will be explained in detail using FIG. 2.

First, the tape-pulling-out element 40 includes a first member 42 forming a recess 42A, and a second member 43 connected to the first member 42 such that the second member 43 can be displaced. The first member 42 is provided at its one end with a turning shaft 44 which turns the second member 43. The recess 42A is formed in the other end of the first member 42. Both ends of the turning shaft 44 project into the track grooves 5, so that the turning shaft 44 can slide along the track grooves 5. The second member 43 is formed with a recess 43A, and the recess 42A of the first member 42 and the recess 43A of the second member 43 form a closed space.

The tape-pulling-out element moving member 50 includes a turning shaft recess 52 with which the turning shaft 44 is engaged. The turning shaft recess 52 is continuous with an end of the track groove 5 at a predetermined position of the tape-pulling-out element moving member 50. The tape-pulling-out element moving member 50 includes a press member 53 and a support member 54. The press member 53 is provided at its one end with a press rib 53A which presses the second member 43 on the side of the turning shaft 44, and at its other end with a shaft 53B which functions as a turning fulcrum of the press rib 53A, and at its intermediate portion with a roller pin 53C. The support member 54 supports the first member 42, and prevents the tape-pulling-out element 40 from rotating when the second member 43 on the side of the turning shaft 44 is pressed by the press rib 53A. The support member 54 is provided at its lower surface with a pin, and if the pin slides in the groove, this exhibits a guide function when the tape-pulling-out element moving member 50 moves toward and away from the tape cassette 2. At a position where the tape-pulling-out element moving member 50 is most separated from the tape cassette 2, the support member 54 turns in the counterclockwise direction through a predetermined angle, thereby turning the tape-pulling-out element 40 in the counterclockwise direction. Thus, the support member 54 moves the tape-pulling-out element 40 into the groove 5 smoothly.

A guider 55 is disposed between the tape-pulling-out element moving member 50 and the loading lever 30. The guider 55 is formed with a guide surface 55A formed on its side on the side of the tape-pulling-out element moving member 50. The guide surface 55A limits movement of the roller pin 53C. The guider 55 can turn through a predetermined angle around the rotation shaft 55B. The guider 55 is biased toward the loading lever 30 by the elastic member 55D.

The loading lever 30 is provided at its end on the side of the guider 55 with a press member 34. The press member 34 presses the elastic member 55D by moving the loading lever 30 toward the tape-pulling-out element moving member 50. If the elastic member 55D is pressed by the press member 34, a free end of the guider 55 moves toward the tape-pulling-out element moving member 50.

The tape threading motion will be explained using FIGS. 1 to 8.

FIG. 1 shows a state of the tape cassette 2 before loading. If this apparatus detects the insertion of the tape cassette 2 into the cassette holder 3, the loading motor 32 starts rotating. The rotation of the loading motor 32 is transmitted to the loading lever 30 by the gear 33 and the rack 31, and the loading lever 30 moves toward the tape-pulling-out element 40. The cassette holder 3 moves together with the loading lever 30. If the tape cassette 2 moves to a position above the cartridge reel 10, a portion of the cassette holder 3 moves the tape cassette 2 toward the base 1, and drive teeth (not shown) provided on a back surface of the tape cassette 2 are engaged with the cartridge reel 10.

By engaging the tape cassette 2 with the cartridge reel 10, the loading motion is completed. FIG. 2 shows a position of the loading lever 30 in this state. In a state where the loading of the tape cassette 2 is completed, the door of the tape cassette 2 is opened. The end of the tape accommodated in the tape cassette 2 is provided with the connection element (not shown), and this connection element is guided to a location near the door.

Figure 2:
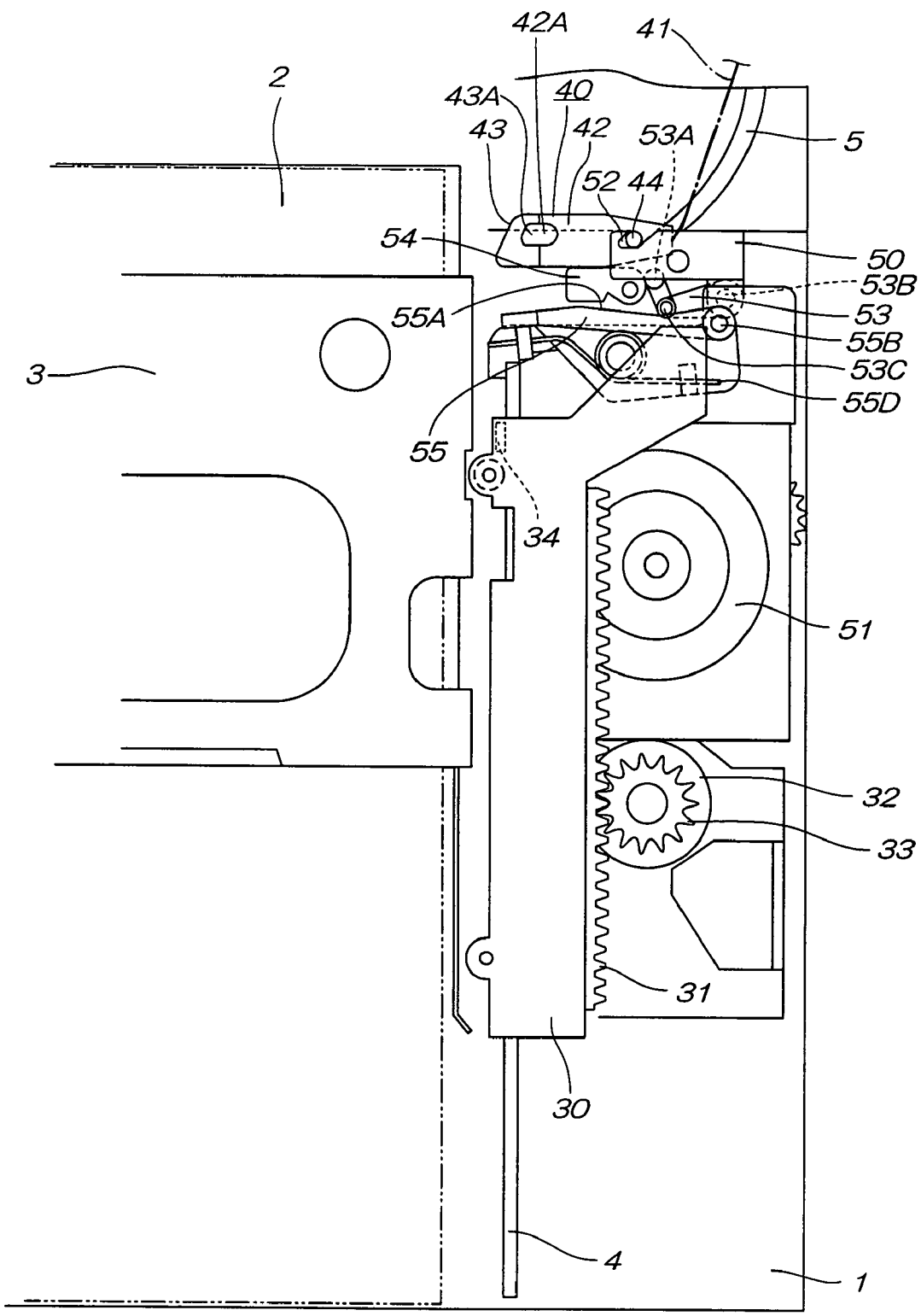
FIG. 2 is a plan view of an essential portion of the apparatus.
Figure 3:
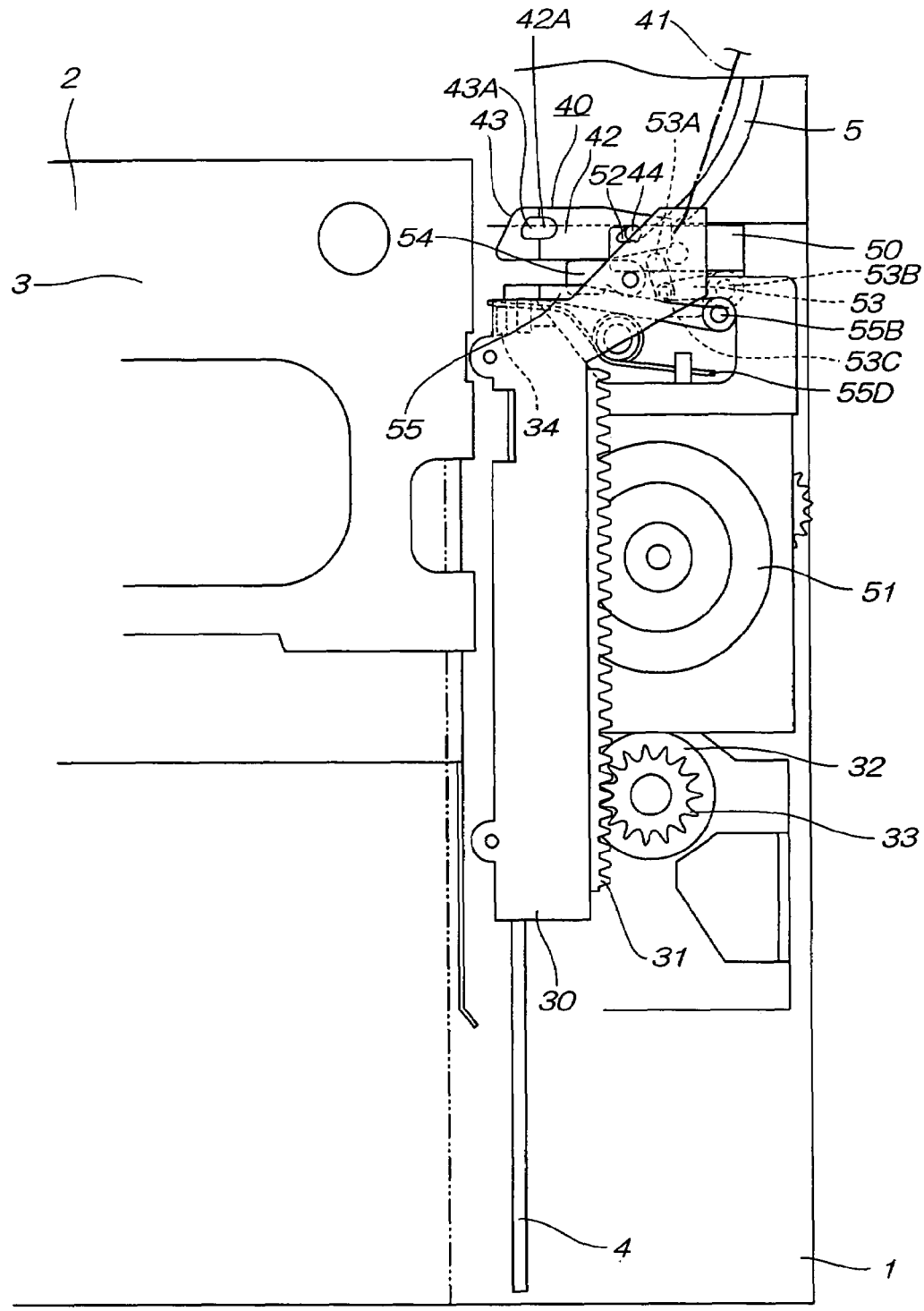
FIG. 3 is a plan view of an essential portion of the apparatus.

The loading lever 30 is moved to a location shown in FIG. 3 from the state shown in FIG. 2 which shows the state where the loading operation of the tape cassette 2 is completed. The loading motor 32 moves the loading lever 30 to the position shown in FIG. 3 and is stopped.

In the state shown in FIG. 3, the press member 34 of the loading lever 30 pushes the elastic member 55D, and a free end of the guider 55 is moved toward the tape-pulling-out element moving member 50. If the guider 55 moves, the position of the roller pin 53C is limited by the guide surface 55A.

The tape-pulling-out element moving motor 51 starts driving from the state shown in FIG. 3. If the tape-pulling-out element moving motor 51 is driven, the tape-pulling-out element moving member 50 is moved toward the tape cassette 2.

If the tape-pulling-out element moving member 50 is moved, the roller pin 53C is moved along the guide surface 55A. As the roller pin 53C approaches the tape cassette 2, the guide surface 55A approaches the tape-pulling-out element moving member 50 and thus, the roller pin 53C approaches the tape-pulling-out element moving member 50. If the roller pin 53C is displaced, the press rib 53A moves toward the tape-pulling-out element 40. The press rib 53A presses the side of the second member 43. If the press rib 53A presses the second member 43, the second member 43 turns around the turning shaft 44. The recess 43A of the second member 43 moves away from the recess 42A of the first member 42 and the recess 42A is opened.

Figure 4:
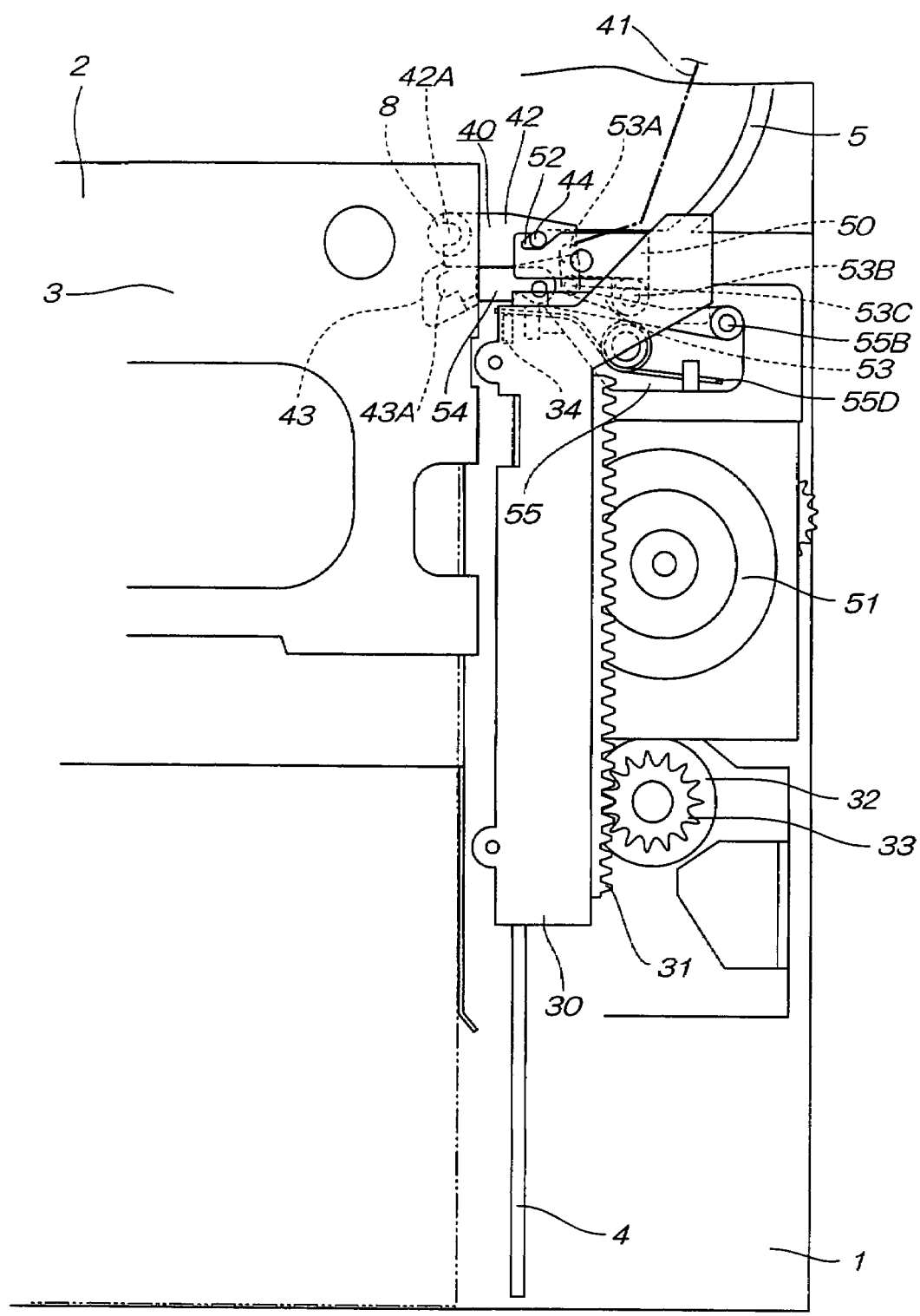
FIG. 4 is a plan view of an essential portion of the apparatus.

The tape-pulling-out element moving motor 51 moves the tape-pulling-out element moving member 50 and stops until the recess 42A of the first member 42 of the tape-pulling-out element 40 is inserted into the cassette 2. FIG. 4 shows this state.

In the state shown in FIG. 4, the recess 42A of the first member 42 is abutted against the connection element 8.

From the state shown in FIG. 4, the loading motor 32 is driven by reverse rotation, and the loading lever 30 is retreated. If the loading lever 30 is retreated, the pressing force of the press member 34 of the loading lever 30 against the guider 55 is released. Therefore, since the free end of the guider 55 moves toward the loading lever 30, the pressing force of the press rib 53A against the second member 43 is released. Since the pressing force of the press rib 53A against the second member 43 is released, the second member 43 turns around the turning shaft 44, the recess 43A of the second member 43 approaches the recess 42A of the first member 42 and the recess 42A is closed. Next, the tape-pulling-out element moving motor 51 starts driving by reverse rotation. By reversely rotating the tape-pulling-out element moving motor 51, the tape-pulling-out element moving member 50 starts moving away from the tape cassette 2.

Figure 5:
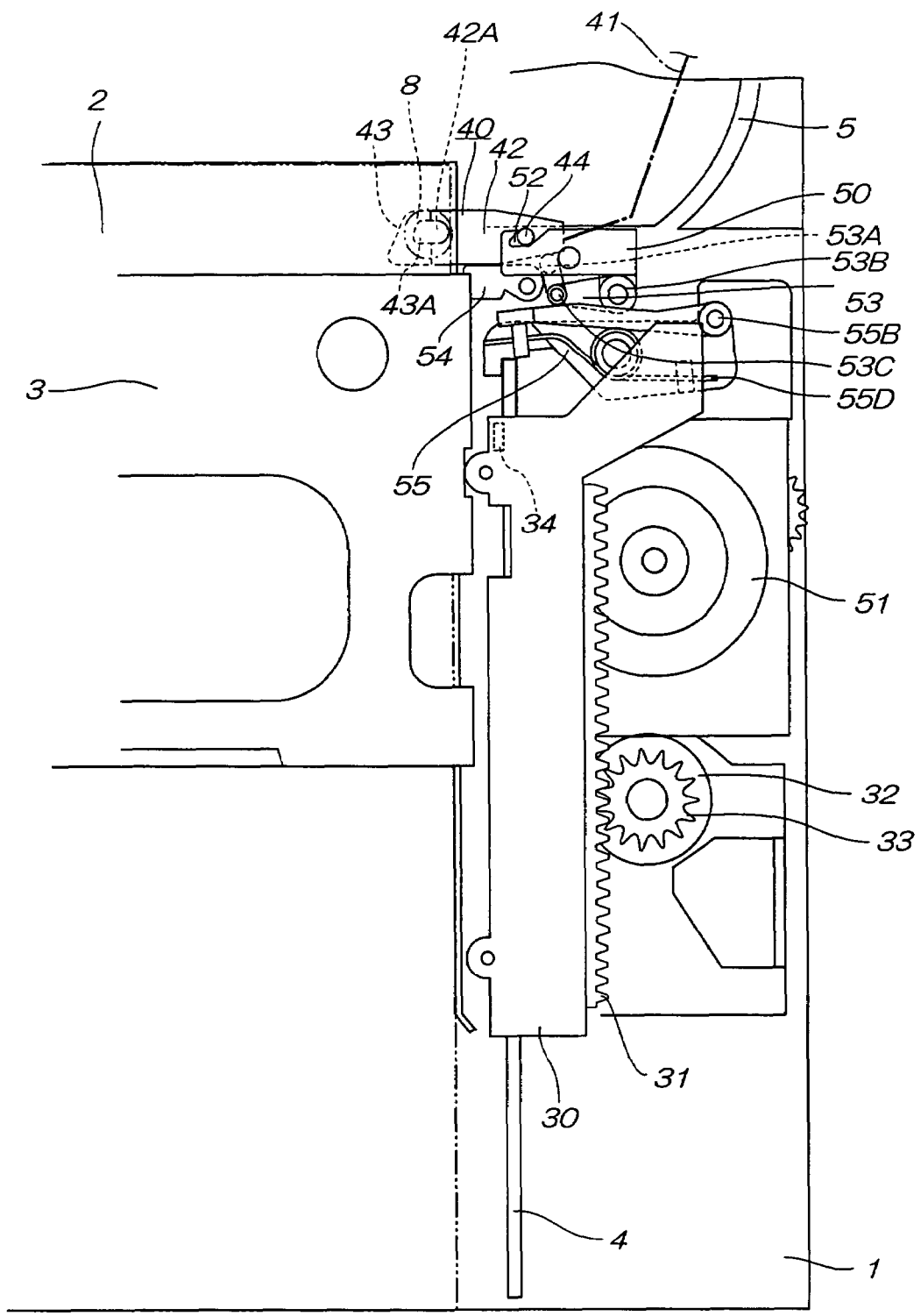
FIG. 5 is a plan view of an essential portion of the apparatus.

Therefore, the connection element 8 is disposed in a closed space formed by the recess 42A of the first member 42 and the recess 43A of the second member 43. That is, the connection element 8 is sandwiched and held between the recess 42A of the first member 42 and the recess 43A of the second member 43. FIG. 5 shows this state.

From the state shown in FIG. 5, the tape-pulling-out element moving motor 51 keeps driving by the reverse rotation. If the tape-pulling-out element moving motor 51 keeps driving by the reverse rotation, the tape-pulling-out element moving member 50 further moves away from the tape cassette 2.

Figure 6:
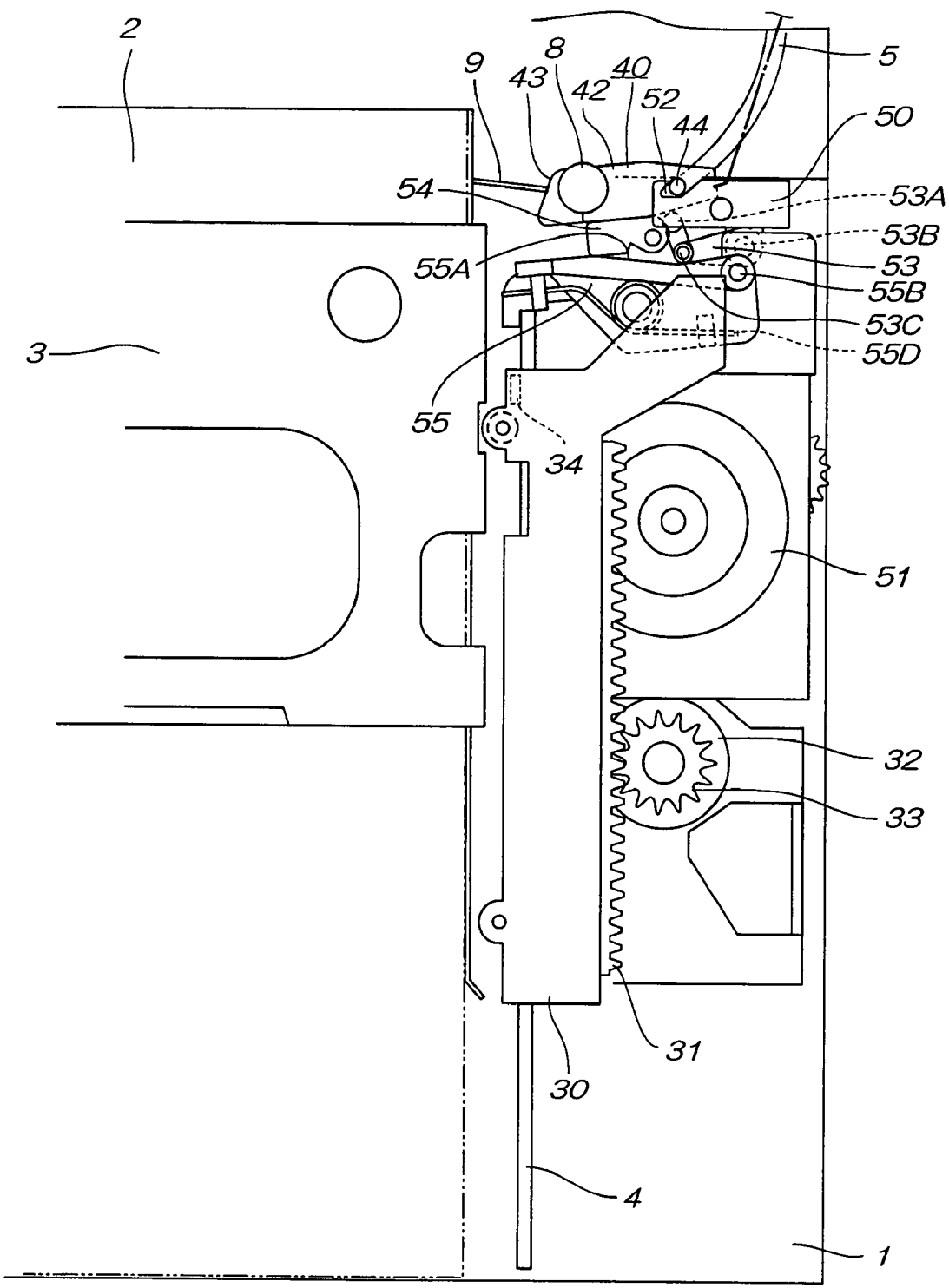
FIG. 6 is a plan view of an essential portion of the apparatus.
Figure 7:
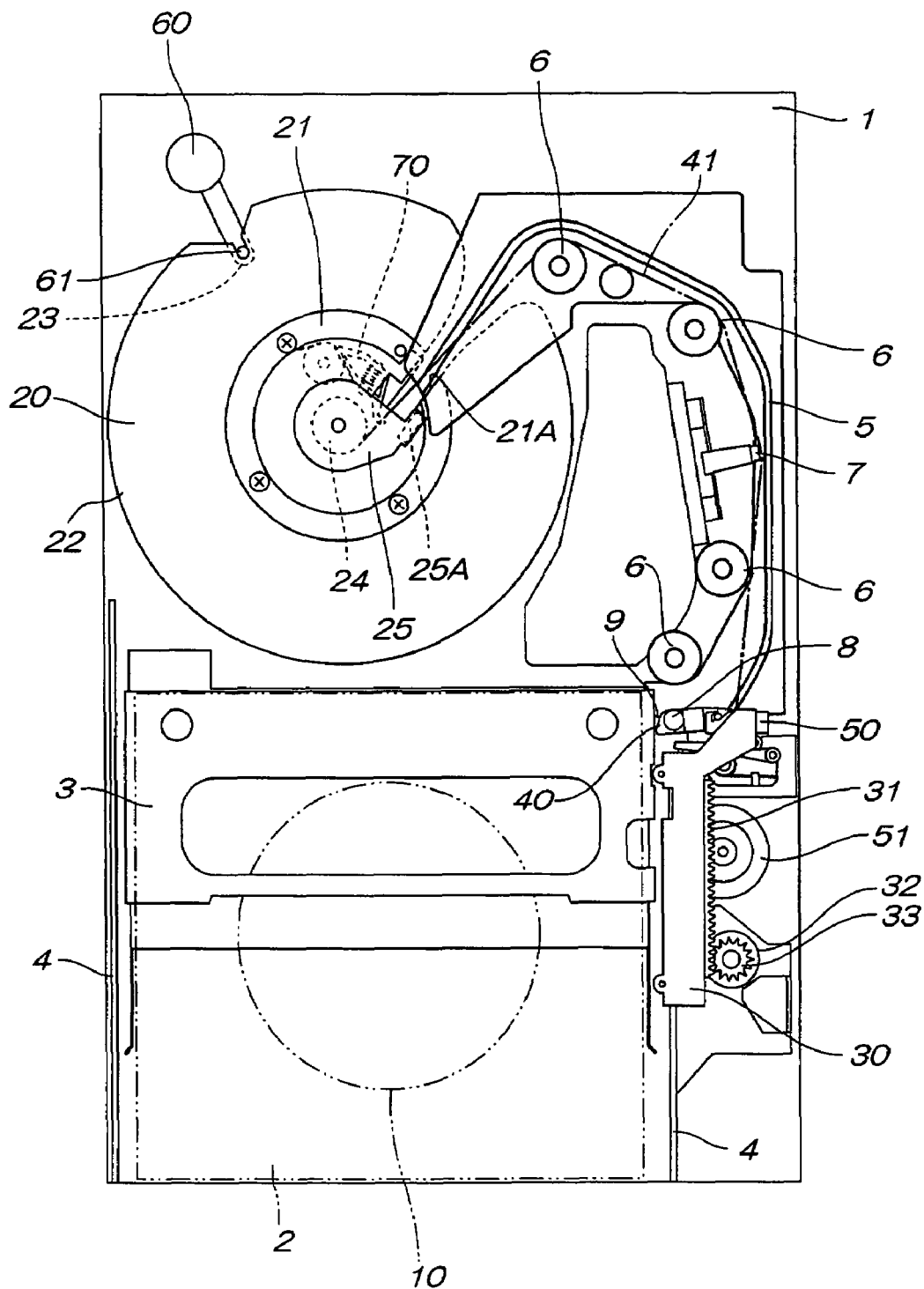
FIG. 7 is a plan view of an essential portion of the apparatus.

FIGS. 6 and 7 show a state where the movement of the tape-pulling-out element moving member 50 away from the tape cassette 2 is completed. As shown in FIG. 6, a tape 9 accommodated in the tape cassette 2 is pulled out together with the connection element 8. In a state where the movement of the tape-pulling-out element moving member 50 away from the tape cassette 2 is completed, the turning shaft recess 52 is in a position continuous with the end of the track groove 5. In this position, the support member 54 is turned in the counterclockwise direction through a predetermined angle, thereby turning the tape-pulling-out element 40 in the counterclockwise direction, and the tape-pulling-out element 40 smoothly moves toward the groove 5.

From the state shown in FIGS. 6 and 7, the tape threading motion is started.

The tape threading motion is carried out by rotating the drive reel 20. At the time of the tape threading motion, the reel hub 21 is released from a drive system of the drive reel 20, and rotation of the reel hub 21 is limited by the pin 61.

Figure 8:
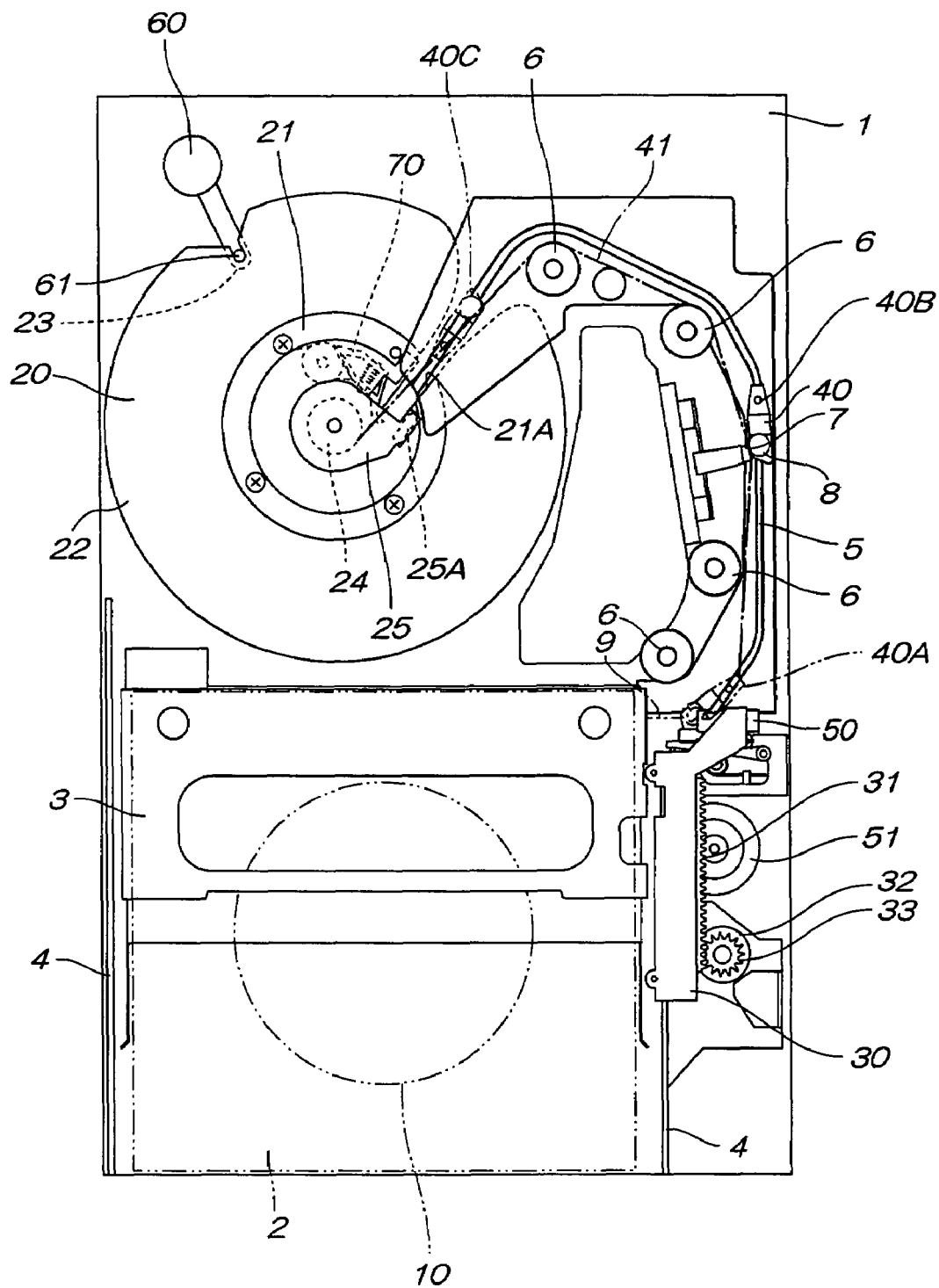
FIG. 8 is a plan view of an essential portion of the apparatus.

The reader tape 41 is reeled up around the drive shaft of the drive reel 20 by the rotation of the drive reel 20. By the reeling up motion of the reader tape 41 around the drive shaft of the drive reel 20, the tape-pulling-out element 40 is pulled by the reader tape 41. Therefore, the both ends of the turning shaft 44 of the tape-pulling-out element 40 move toward the track grooves 5 from the turning shaft recess 52, and slide in the track grooves 5. FIG. 8 shows this state.

FIG. 8 shows a state where the turning shaft 44 of a tape-pulling-out element 40A moves from the turning shaft recess 52 to the track groove 5, a tape-pulling-out element 40B moves to an intermediate portion of the track groove 5, and a tape-pulling-out element 40C moves to a location close to the reel hub 21 of the drive reel 20. By sequentially moving the tape-pulling-out element like the tape-pulling-out element 40A, the tape-pulling-out element 40B and the tape-pulling-out element 40C, the tape 9 accommodated in the tape cassette 2 can be pulled out and introduced to the reel hub 21.

If the reader tape 41 is reeled up into the reel hub 21, the tape-pulling-out element 40 is pulled into the hub opening 21A. The tape-pulling-out element 40 pulled into the hub opening 21A is attracted by the magnet 25A, thereby completing the reeling up operation of the reader tape 41. In this state, the tape-pulling-out element 40 closes the hub opening 21A, and a terminate end surface of the tape-pulling-out element 40, i.e., an end surface on the mounting side of the connection element 8 is disposed such as to be continuous with the outer peripheral surface of the reel hub 21.

The above-described motion is carried out by normally rotating the drive shaft 24, but if it is detected that the tape-pulling-out element 40 closes the hub opening 21A, the rotation of the drive shaft 24 is stopped. By reversely rotating the drive shaft 24 through a predetermined angle, the lock member 70 is operated and the drive shaft 24 is connected to the reel hub 21 and the reel flange 22.

If the drive shaft 24 is connected to the reel hub 21 and the reel flange 22, the lock motor 60 is operated and the pin 61 is retreated from the flange groove 22.

With this above motion, the tape threading motion is completed.

Next, the head cleaning mechanism of this embodiment will be explained using FIGS. 9 to 13.

Figure 9:
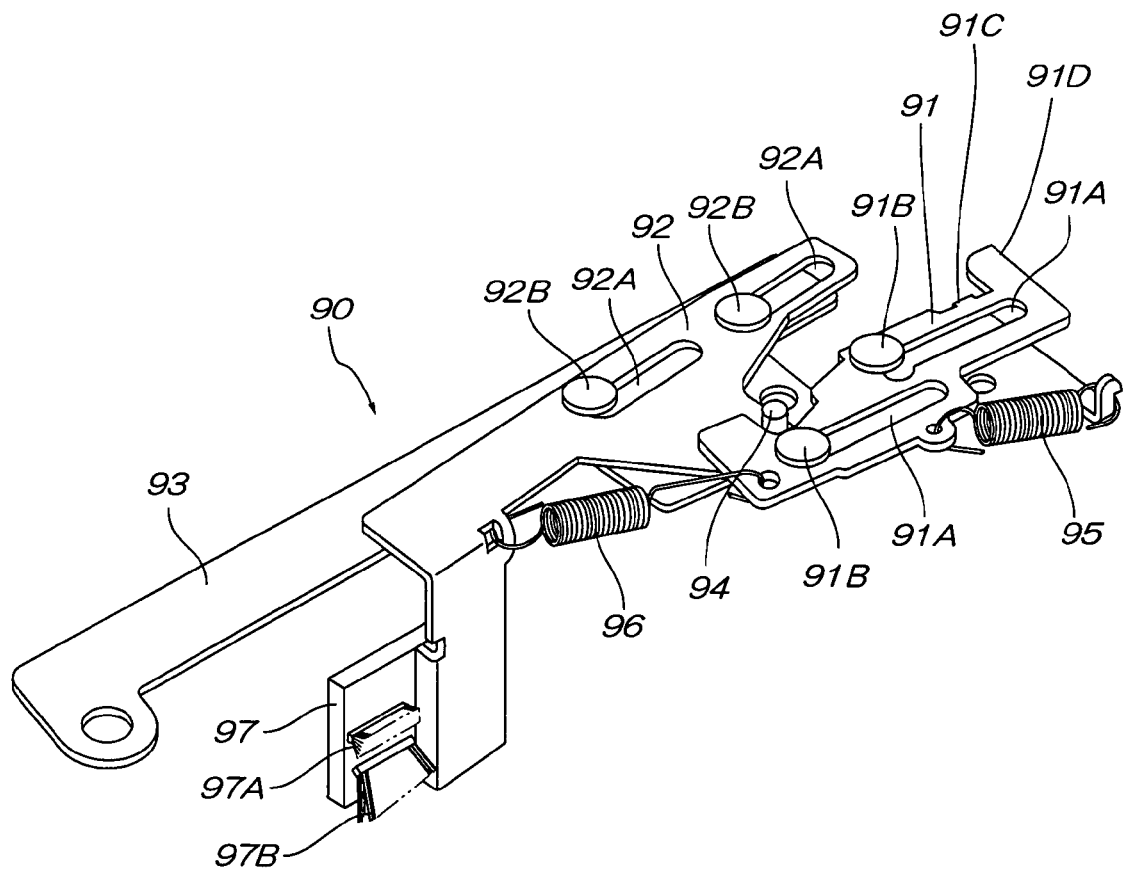
FIG. 9 is a perspective view of a head cleaning mechanism of the embodiment.
Figure 10:
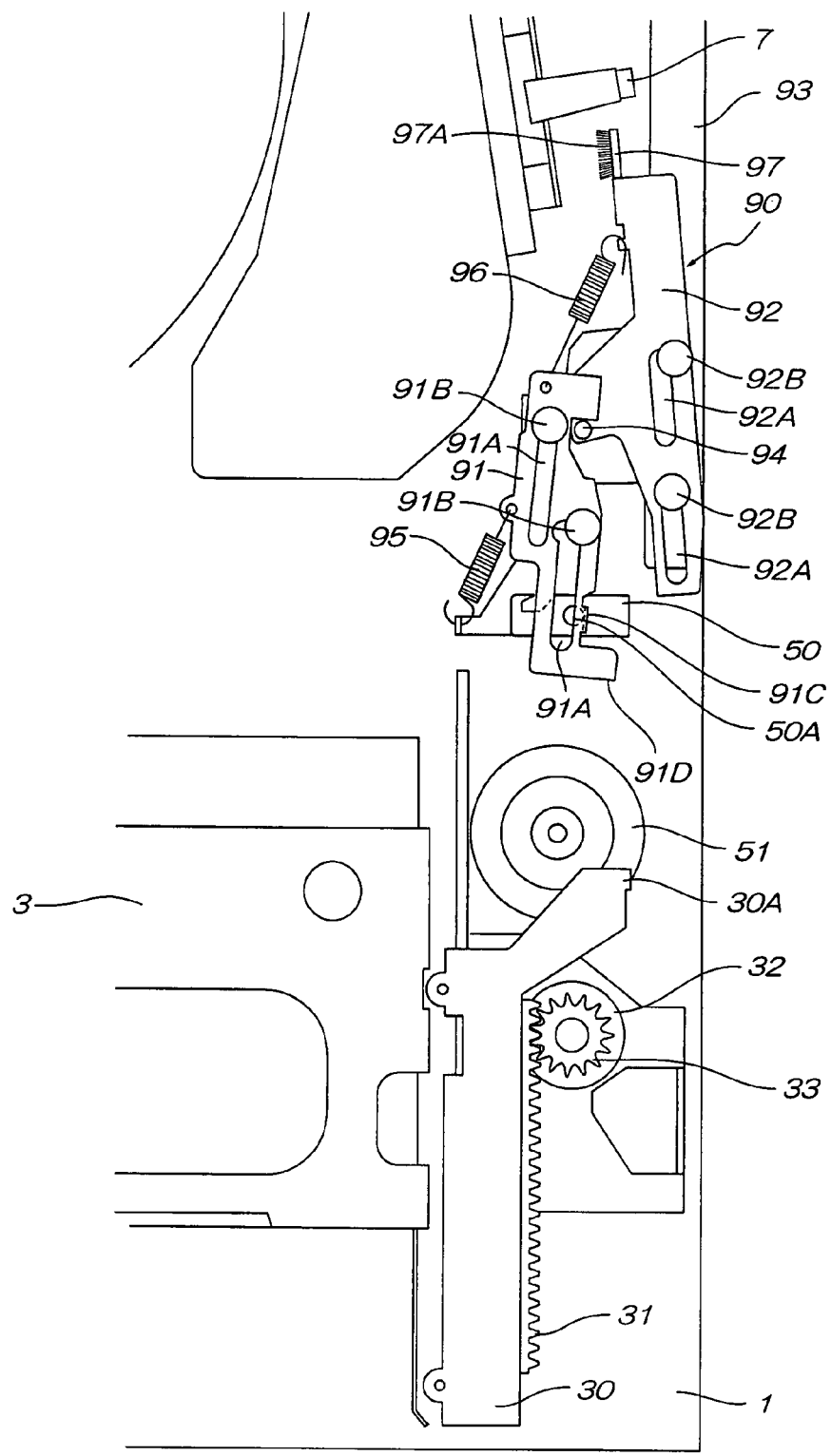
FIG. 10 is a plan view of an essential portion showing a standby state of the head cleaning mechanism.

FIG. 9 is a perspective view of a head cleaning mechanism of the embodiment. FIG. 10 is a plan view of an essential portion showing a standby state of the head cleaning mechanism.

Figure 11:
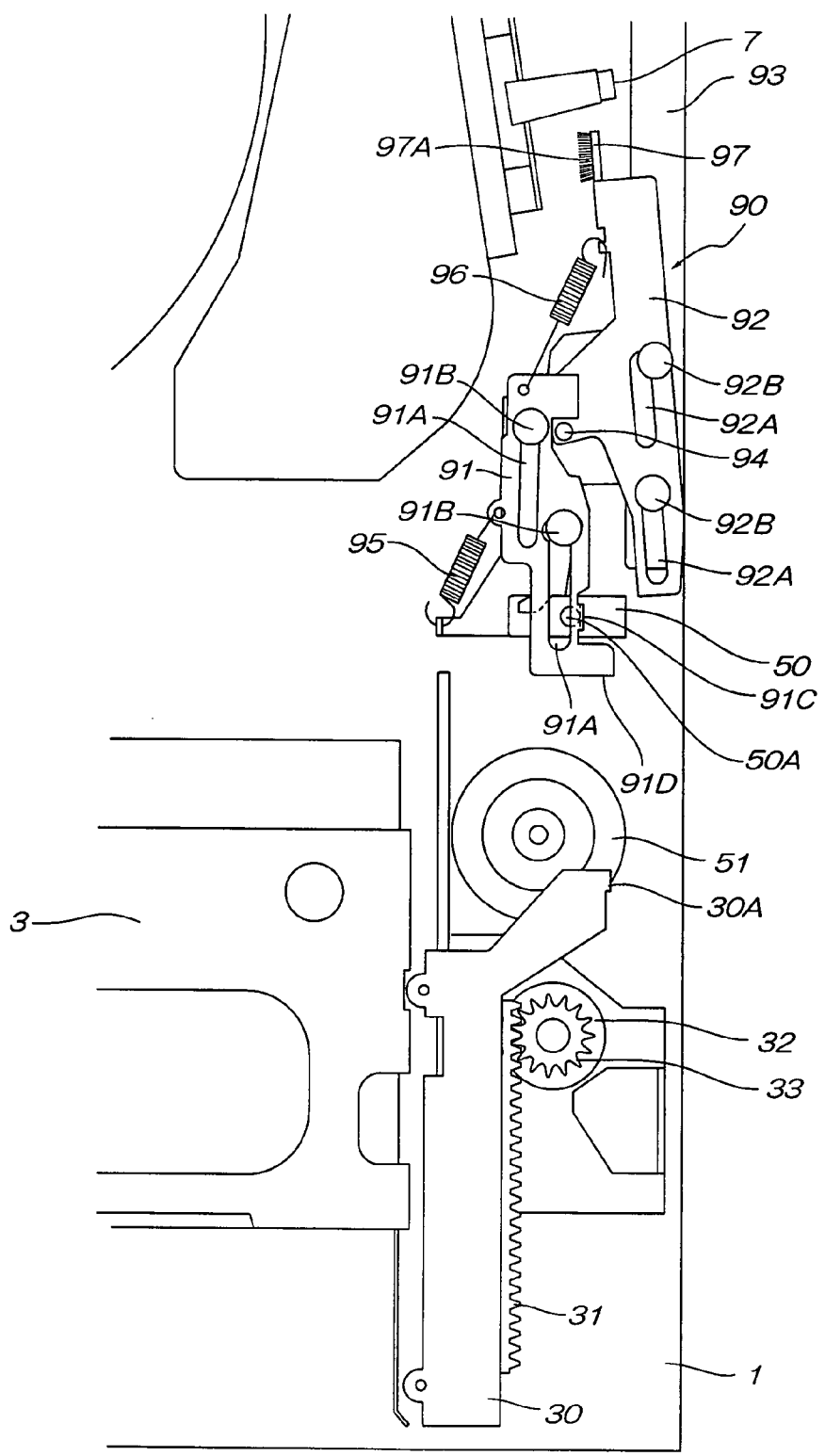
FIG. 11 is a plan view of an essential portion showing a first stage of operation state of the head cleaning mechanism.
Figure 12:
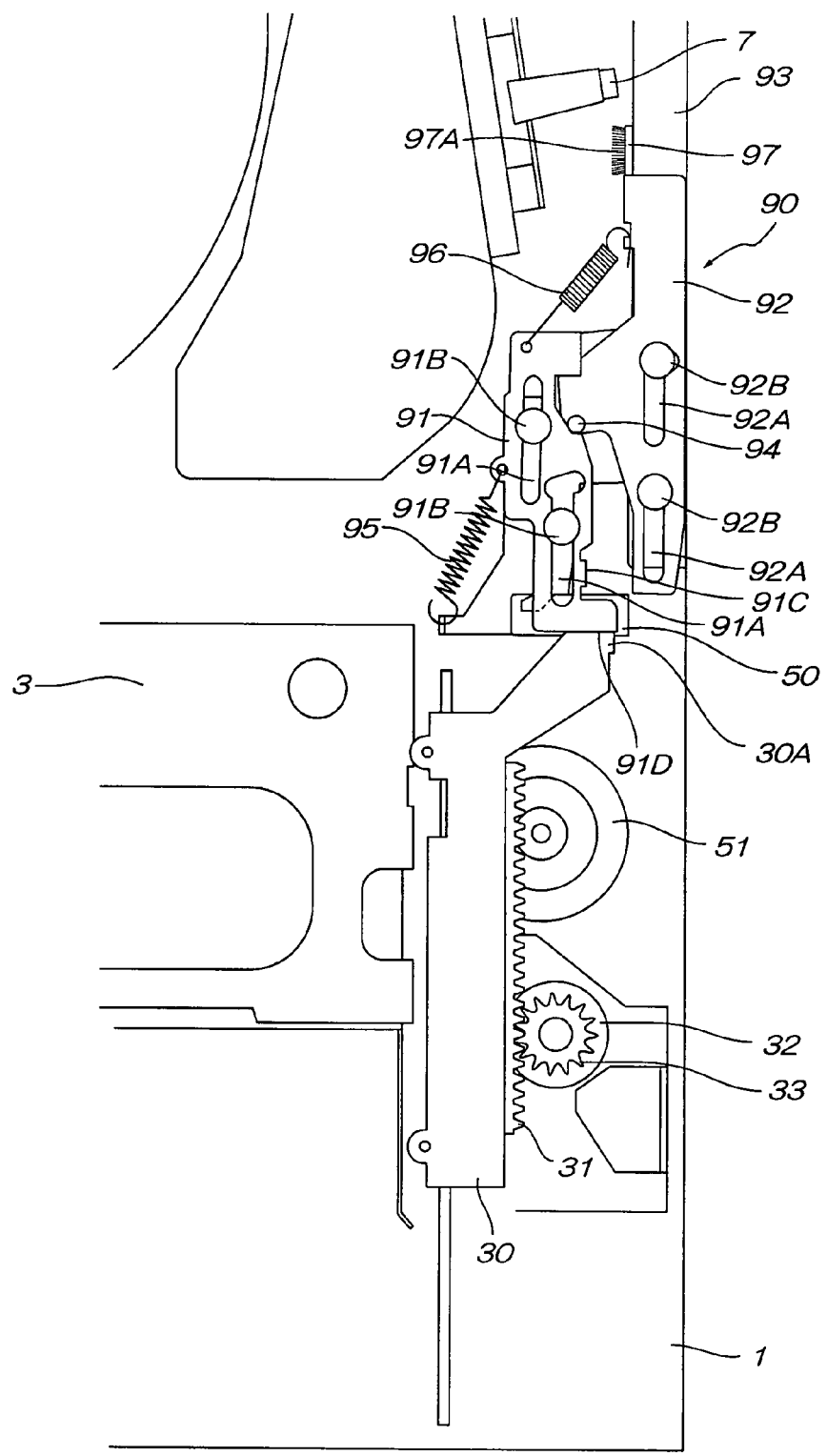
FIG. 12 is a plan view of an essential portion showing a second stage of operation state of the head cleaning mechanism.
Figure 13:
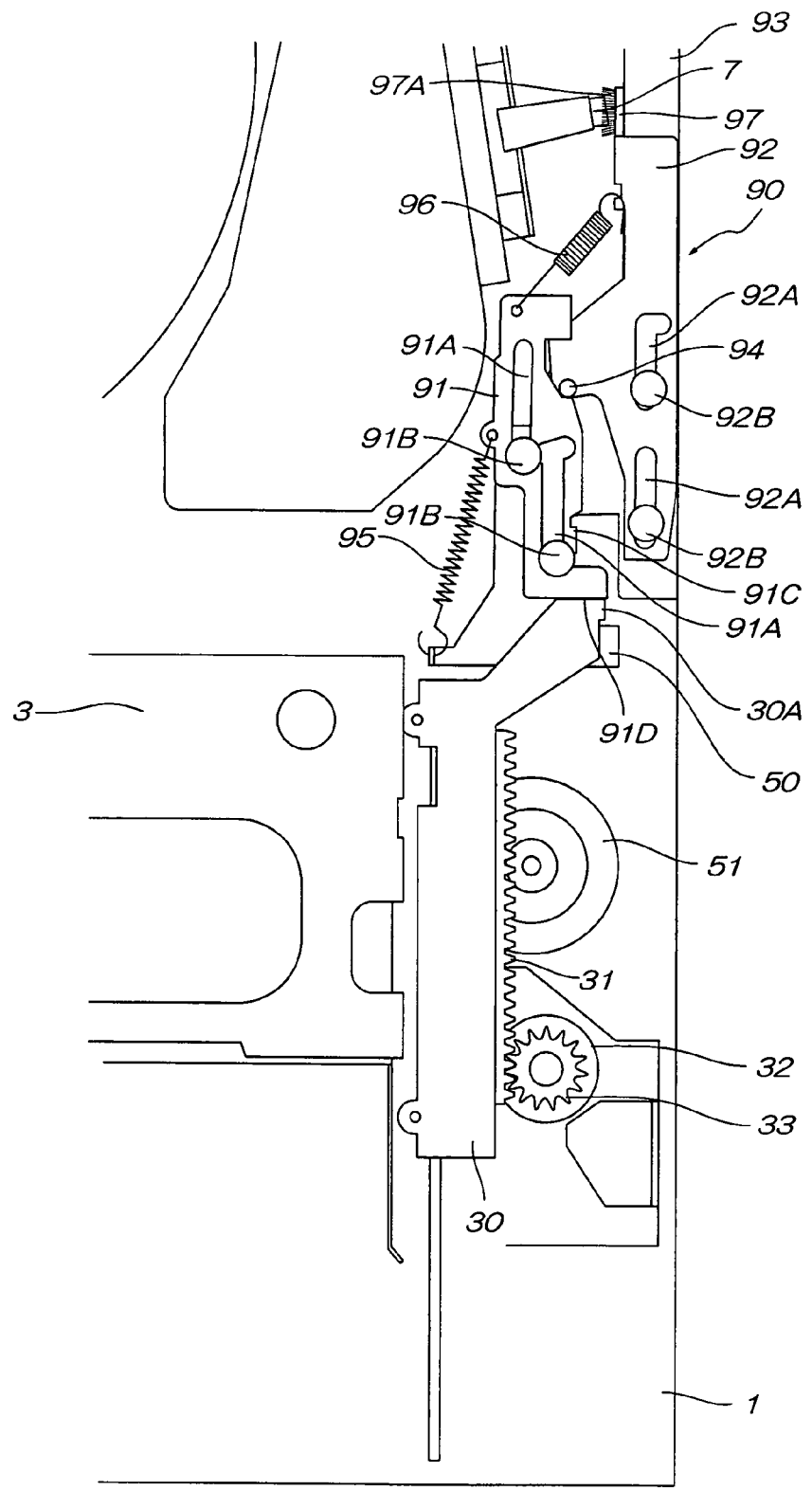
FIG. 13 is a plan view of an essential portion showing a third stage of operation state of the head cleaning mechanism.
Figure 14:
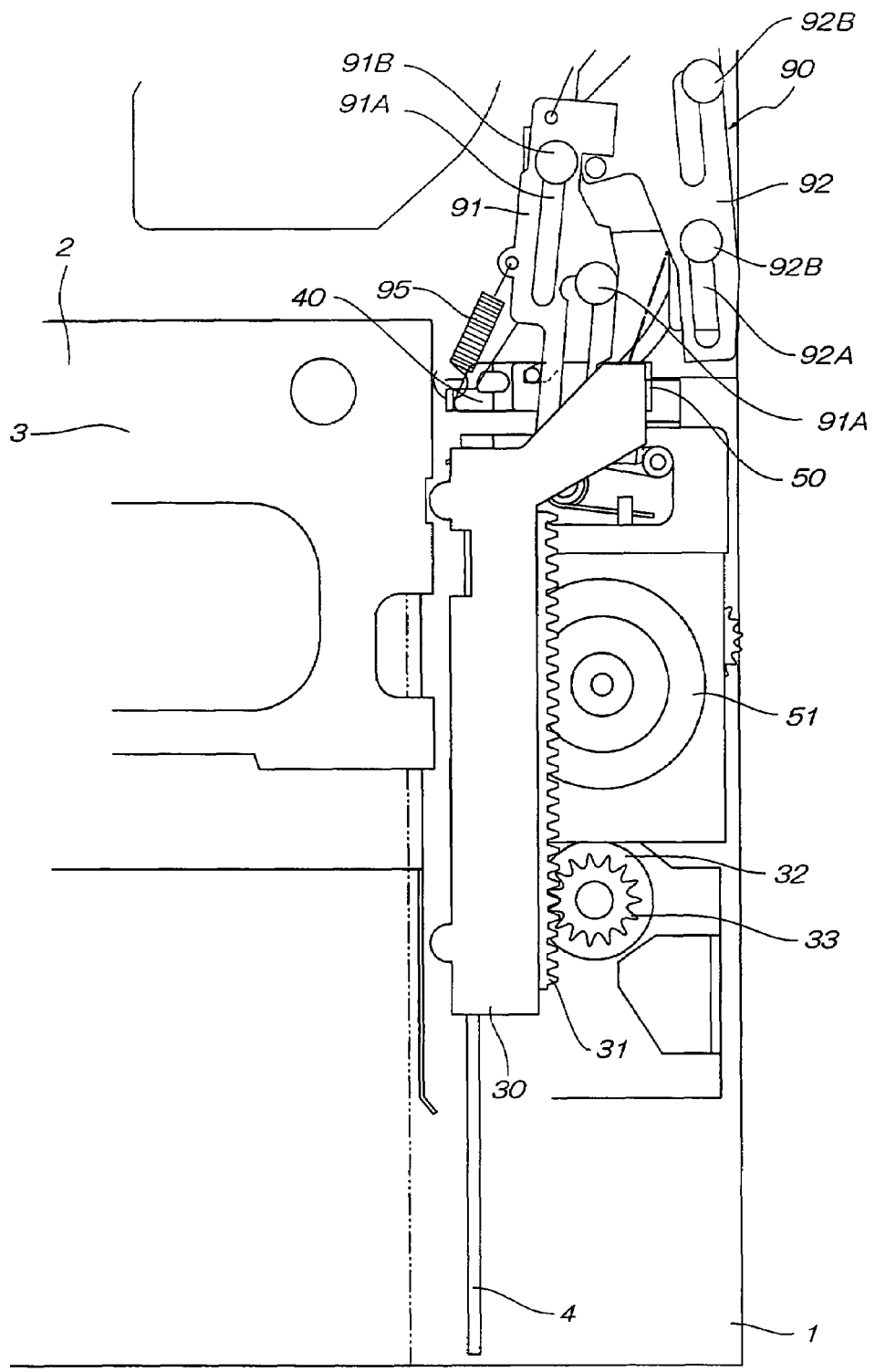
FIG. 14 is a plan view of an essential portion showing a position of the head cleaning mechanism in the state shown in FIG. 3.

FIG. 11 is a plan view of an essential portion showing a first stage of operation state of the head cleaning mechanism. FIG. 12 is a plan view of an essential portion showing a second stage of operation state of the head cleaning mechanism. FIG. 13 is a plan view of an essential portion showing a third stage of operation state of the head cleaning mechanism. FIG. 14 is a plan view of an essential portion showing a position of the head cleaning mechanism in the state shown in FIG. 3. In FIGS. 10 to 14, some members which are not used in the motion explanation are omitted from the drawings.

As shown in FIG. 9, the head cleaning mechanism 90 is provided with a first cam member 91 and a second cam member 92 such that these cam members can be displaced with respect to a cam base 93. The first cam member 91 and the second cam member 92 are engaged with each other through an engagement pin 94. A first spring 95 connects the first cam member 91 and the cam base 93 with each other. A second spring 96 connects the first cam member 91 and the second cam member 92 with each other. A head brush portion 97 is provided on an end of the second cam member 92.

The first cam member 91 includes a first cam groove 91A. A first cam pin 91B is provided on the cam base 93, and the first cam pin 91B is disposed in a groove of the first cam groove 91A. An end of the first cam member 91 on the side of the loading lever 30 is formed with a moving member abutment portion 91C and a lever abutment portion 91D. The moving member abutment portion 91C is abutted against a projection 50A of the tape-pulling-out element moving member 50. The lever abutment portion 91D is abutted against an end 30A of the loading lever 30. The second cam member 92 includes a second cam groove 92A. A second cam pin 92B is provided on the cam base 93, and the second cam pin 92B is disposed in a groove of the second cam groove 92A. The head brush portion 97 has one brush portion 97A and the other brush portion 97B having different brush directions. Brush tips of the brush portion 97A and brush tips of the other brush portion 97B are inclined in directions separating from each other. The head brush portion 97, the brush portion 97A and the brush portion 97B are made of antistatic material. The reader tape 41 is always located on the outer side of the head brush portion 97. When the head cleaning mechanism 90 moves, the head cleaning mechanism 90 moves while pushing the reader tape 41 away. Therefore, if the head brush portion 97 is made of antistatic material, static electricity is generated by friction with respect to the reader tape 41, and it is possible to prevent the magnetic head 7 from being statically destroyed. Since the brush portions 97A and 97B are also made of antistatic material, when the brush portions 97A and 97B abut against the magnetic head 7 at the time of movement of the head cleaning mechanism 90, and when the magnetic head 7 vertically moves and cleans, static electricity is not generated by friction, and it is possible to prevent the magnetic head 7 from being statically destroyed.

Next, the motion of the head cleaning mechanism will be explained using FIGS. 10 to 13.

FIG. 10 shows a state in which the head cleaning motion is not carried out or a state of the head cleaning mechanism 90 before the head cleaning is started.

In the state shown in FIG. 10, the first cam member 91 and the second cam member 92 are limited such that the directions of the grooves of the first cam groove 91A and the second cam groove 92A do not match with the moving direction of the loading lever 30. That is, one end of the first cam member 91 on the side of the loading lever 30 is turned in the clockwise direction through a predetermined angle and is inclined, and one end of the second cam member 92 on the side of the loading lever 30 is turned in the counterclockwise direction through a predetermined angle and is inclined. The first cam member 91 is disposed such that the first cam pin 91B is located on the other end side of the first cam groove 91A, and the second cam member 92 is disposed such that the second cam pin 92B is located on the other end side of the second cam groove 92A. That is, the first cam member 91 and the second cam member 92 are limited to positions where they most approach the loading lever 30 with respect to the cam base 93.

The motion completed state of a first stage of the head cleaning mechanism 90 is shown in FIG. 11.

In FIG. 11, the tape-pulling-out element moving member 50 moves away from the cassette holder 3 by a predetermined distance. This motion of the tape-pulling-out element moving member 50 is carried out by the tape-pulling-out element moving motor 51. By this motion of the tape-pulling-out element moving member 50, the moving member abutment portion 91C which is in abutment against the projection 50A of the tape-pulling-out element moving member 50 moves in the same direction, the first cam member 91 turns around the first cam pin 91B in the counterclockwise direction through a predetermined angle, and the groove direction of the first cam groove 91A matches with the moving direction of the loading lever 30.

Next, if the loading lever 30 is moved toward the head cleaning mechanism 90 by a predetermined distance from the state shown FIG. 11, the state shown in FIG. 12 is obtained. This motion of the loading lever 30 is carried out by the loading motor 32. By the movement of the loading lever 30, the lever abutment portion 91D which is in abutment against the end 30A of the loading lever 30 moves toward the magnetic head 7. By the movement of the lever abutment portion 91D, the first cam member 91 first moves toward the magnetic head 7. If the first cam member 91 moves toward the magnetic head 7 by a predetermined distance, the second cam member 92 turns around the second cam pin 92B in the clockwise direction through a predetermined angle by the engagement between the engagement pin 94 and the first cam member 91. By this clockwise turning motion, the groove direction of the second cam groove 92A of the second cam member 92 matches with the moving direction of the loading lever 30.

If the loading lever 30 moves in the same direction (toward the magnetic head 7) by a predetermined distance from the state shown in FIG. 12, a state shown in FIG. 13 is obtained. That is, if the lever abutment portion 91D which is in abutment against the end 30A of the loading lever 30 further moves toward the magnetic head 7 by the motion of the loading lever 30, the first cam member 91 and the second cam member 92 move toward the magnetic head 7. By this movement the head brush portion 97 provided on the end of the second cam member 92 abuts against the magnetic head 7. In a state where the head brush portion 97 abuts against the magnetic head 7, the magnetic head 7 is operated.

In the apparatus of this kind, in order to make the magnetic head 7 applicable to the plurality of tracks formed in the tape, the magnetic head 7 can move in the widthwise direction of the tape. The head cleaning of this embodiment is carried out by moving the magnetic head 7 in the widthwise direction of the tape a plurality of times in a state where the head brush portion 97 is fixed.

Next, a positional relation between the head cleaning mechanism 90 and other members in a state where the head cleaning motion is not carried out will be explained.

FIG. 14 shows a state before the pulling out operation of the connecting element 8 of the end of the tape 9 is carried out by the tape-pulling-out element 40.

In this state, the loading lever 30 has been moved to the position where the head cleaning mechanism 90 is disposed. However, as shown in FIG. 11, the first cam member 91 and the second cam member 92 are limited such that the groove directions of the first cam groove 91A and the second cam groove 92A do not match with the moving direction of the loading lever 30. Therefore, the end 30A of the loading lever 30 is located between the first cam member 91 and the second cam member 92, and the end 30A is not in abutment against the lever abutment portion 91D. The first cam member 91 is located in a space formed between the tape-pulling-out element moving member 50 and the loading lever 30.

According to this embodiment, the head cleaning mechanism 90 is operated utilizing the tape-pulling-out element moving member 50 which moves the tape-pulling-out element 40 into the tape cassette 2 and the loading lever 30 which moves the tape cassette 2 into the cartridge reel 10. Therefore, the tape-pulling-out element moving motor 51 and the loading motor 32 can be used as drive sources of the head cleaning mechanism 90.

According to the embodiment, the motion of the head cleaning mechanism 90 divided into two stages, i.e., the moving motion for bringing the cam mechanisms 91 and 92 into the operable state, and a motion for changing the position of the head brush portion 97, and the functions of the member and motor to be operated are divided. Therefore, stable operation having little malfunction can be realized.

According to the embodiment, the cam mechanism also comprises two members 91 and 92, the functions of the operations of two stages are also divided on the side of the cam mechanisms 91 and 92, and stable operation having little malfunction can be realized.

According to the embodiment, the loading lever 30 and the tape-pulling-out element moving member 50 are disposed on the one side of the head cleaning mechanism 90, and the magnetic head 7 is disposed on the other side. Therefore, the head cleaning mechanism 90 can be moved from the one side. Thus, it is easy to transmit the operations of the loading lever 30 and the tape-pulling-out element moving member 50 to the head cleaning mechanism 90.

According to the embodiment, a member formed with the track groove 5 is provided with the head cleaning mechanism 90. Therefore, the special member for providing the head cleaning mechanism 90 can be omitted, and the space can be saved with low cost.

According to the embodiment, it is possible to apply the brush tip of the one brush portion 97A in the moving direction and to apply the brush tip of the other brush portion 97B in the opposite direction, and it is possible to carry out these applications alternately. Therefore, it is possible to effectively clean different kinds of contamination and accretion.

INDUSTRIAL APPLICABILITY

The magnetic recording/reproducing apparatus and the tape-pulling-out element of this invention are suitable for an apparatus such as a linear type open system, and such apparatus is especially useful as a network tape storage.

The invention claimed is:

1. A magnetic recording/reproducing apparatus comprising:
   a leader tape having one end connected to a drive reel,
   a tape-pulling-out element connected to the other end of said leader tape,
   a tape-pulling-out element moving member for moving said tape pulling-out element into a tape cassette,
   a pulling-out element moving motor for operating said tape-pulling-out element moving member,
   a cassette holder for moving said tape cassette to a cartridge reel,
   a loading lever connected to said cassette holder,
   a loading motor for operating said loading lever, and
   a magnetic head for recording and reproducing into and from a tape, in which an end of said tape accommodated in said tape cassette has a coupling element, said coupling element is pulled out by said tape-pulling-out element and said tape is taken up around said drive reel,
   said magnetic recording/reproducing apparatus comprising a head cleaning mechanism for cleaning said magnetic head, wherein
   said head cleaning mechanism includes;
   a head brush portion for holding a brush portion, and
   a cam mechanism for changing a position of said head brush portion,
   said cam mechanism is operated by said tape-pulling-out element moving member operated by said pulling-out element moving motor and said loading lever operated by said loading motor.

2. The magnetic recording/reproducing apparatus according to claim 1, wherein said tape-pulling-out element moving member brings said cam mechanism into its operable state, and said loading lever changes the position of said head brush portion 1.

3. A magnetic recording/reproducing apparatus, comprising:
   a leader tape having one end connected to a drive reel,
   a tape-pulling-out element connected to the other end of said leader tape,
   a tape-pulling-out element moving member for moving said tape-pulling-out element into a tape cassette,
   a pulling-out element moving motor for operating said tape-pulling-out element moving member,
   a cassette holder for moving said tape cassette to a cartridge reel,
   a loading lever connected to said cassette holder,
   a loading motor for operating said loading lever, and
   a magnetic head for recording and reproducing into and from a tape, in which an end of said tape accommodated in said tape cassette has a coupling element, said coupling element is pulled out by said tape-pulling-out element and said tape is taken up around said drive reel,
   said magnetic recording/reproducing apparatus comprising a head cleaning mechanism for cleaning said magnetic head, wherein
   said head cleaning mechanism includes:
   a head brush portion for holding a brush portion, and
   a cam mechanism for changing a position of said head brush portion
   said cam mechanism is operated by said tape-pulling-out element moving member, and said loading lever,
   wherein said tape-pulling-out element moving member brings said cam mechanism into its operable state, and said loading lever changes the position of said head brush portion, and
   wherein said cam mechanism includes a first cam mechanism which abuts against said tape-pulling-out element moving member and said loading lever, and a second cam mechanism for holding said head brush portion, said first cam mechanism is formed with a first cam groove, said tape-pulling-out element moving member displaces said first cam groove in an operation direction of said loading lever, and said loading lever moves said second cam mechanism together with said first cam mechanism.

4. A magnetic recording/reproducing apparatus comprising:
   a leader tape having one end connected to a drive reel,
   a tape-pulling-out element connected to the other end of said leader tape,
   a tape-pulling-out element moving member for moving said tape-pulling-out element into a tape cassette,
   a pulling-out element moving motor for operating said tape-pulling-out element moving member,
   a cassette holder for moving said tape cassette to a cartridge reel,
   a loading lever connected to said cassette holder,
   a loading motor for operating said loading lever, and
   a magnetic head for recording and reproducing into and from a tape, in which an end of said tape accommodated in said tape cassette has a coupling element, said coupling element is pulled out by said tape-pulling-out element and said tape is taken up around said drive reel,
   said magnetic recording/reproducing apparatus comprising a head cleaning mechanism for cleaning said magnetic head, wherein
   said head cleaning mechanism includes:
   a head brush portion for holding a brush portion, and
   a cam mechanism for changing a position of said head brush portion,
   said cam mechanism is operated by said tape-pulling-out element moving member, and said loading lever,
   wherein said tape-pulling out element moving member is disposed on the side of said cassette holder, said loading lever is disposed on the side of said cassette holder on the same side as said tape-pulling-out element moving member, and said head cleaning mechanism is disposed between said magnetic head and said loading lever.

5. The magnetic recording/reproducing apparatus according to claim 4, wherein a pair of track grooves for guiding said tape-pulling-out element is formed between a portion of said apparatus in the vicinity of said tape-pulling-out element moving member and said drive reel, said magnetic head is disposed between said pair of track grooves, and a member forming one of said track grooves is provided with said head cleaning mechanism.

6. The magnetic recording/reproducing apparatus according to claim 1, wherein said head brush portion includes a plurality of brush portions, and at least one of said brush portions has a brush direction different from those of other brush portions.

7. The magnetic recording/reproducing apparatus according to claim 6, wherein a brush tip of the one brush portion and brush tips of other brush portions are inclined in mutually separating directions.

* * * * *